(12) United States Patent
Winkel et al.

(10) Patent No.: US 8,876,033 B2
(45) Date of Patent: *Nov. 4, 2014

(54) TRANSPORTER FOR CONTAINERS OF SPOOLED WIRE OR CABLE

(75) Inventors: Mark K. Winkel, Indian Head Park, IL (US); Martin J. McGuire, Downers Grove, IL (US)

(73) Assignee: Windy City Wire Cable and Technology Products, LLC, Bolingbrook, IL (US)

( * ) Notice: Subject to any disclaimer, the term of this patent is extended or adjusted under 35 U.S.C. 154(b) by 782 days.

This patent is subject to a terminal disclaimer.

(21) Appl. No.: 13/117,857

(22) Filed: May 27, 2011

(65) Prior Publication Data

US 2012/0298788 A1 Nov. 29, 2012

(51) Int. Cl.
| | |
|---|---|
| *B65H 16/02* | (2006.01) |
| *B65H 49/32* | (2006.01) |
| *B62B 1/20* | (2006.01) |
| *B65H 49/38* | (2006.01) |
| *B62B 1/00* | (2006.01) |
| *B62B 5/06* | (2006.01) |

(52) U.S. Cl.
CPC .......... *B65H 49/322* (2013.01); *B62B 2206/02* (2013.01); *B65H 49/32* (2013.01); *B62B 1/008* (2013.01); *B62B 2202/025* (2013.01); *B62B 1/20* (2013.01); *B62B 5/067* (2013.01); *B65H 49/38* (2013.01)
USPC ...................... 242/557; 242/403.1; 242/578.2

(58) Field of Classification Search
CPC ............ B65D 85/04; B62B 1/14; B62B 1/18; B62B 1/00; B62B 3/04; B62B 1/20; B62B 3/00; B62B 3/104; B62B 3/003; B62B 1/008; B62B 1/004; B62B 5/0083; B62B 5/067; B65H 49/38; B65H 49/32; B65H 49/328; B65H 49/322; B65H 49/325; B65H 57/18; B65H 75/40; B65H 49/22; B65H 75/24; B65H 2402/412; B65H 2701/34
USPC ........ 242/403, 403.1, 557, 588, 588.3, 588.6, 242/598, 598.3, 598.5, 578, 578.2
See application file for complete search history.

(56) References Cited

U.S. PATENT DOCUMENTS

| | | | |
|---|---|---|---|
| 3,412,847 | A | 11/1968 | Wise et al. |
| 3,854,509 | A | 12/1974 | Bailey |
| 4,367,853 | A | 1/1983 | Kotzur |
| 4,406,419 | A | 9/1983 | Kotzur |
| 4,477,033 | A | 10/1984 | Kotzur et al. |

(Continued)

OTHER PUBLICATIONS

Wire Caddy, Cable Reel Stands—Quick Spooler, downloaded from http://www.quickspooler.com/ on Jul. 14, 2009.

(Continued)

*Primary Examiner* — William A Rivera
(74) *Attorney, Agent, or Firm* — Perkins IP Law Group LLC; Jefferson Perkins

(57) ABSTRACT

A transporter for manually transporting cartons of wire or cable has a horizontal support member having first and second pieces, first and second spaced-apart vertical support members, and first and second axial inserts attached to the vertical support members for insertion into entry holes in a reel or carton. A collapsible handle is affixed to the support structure and one or more stabilization members prevent the carton from rotating as wire is dispensed from the carton.

40 Claims, 5 Drawing Sheets

(56) References Cited

U.S. PATENT DOCUMENTS

| | | | | |
|---|---|---|---|---|
| 4,741,495 | A | | 5/1988 | Kotzur |
| 5,222,683 | A | | 6/1993 | Blackshire |
| 5,529,186 | A | | 6/1996 | Bass |
| 5,551,647 | A | | 9/1996 | Browning |
| 5,626,307 | A | * | 5/1997 | Smith .................... 242/403.1 |
| 5,704,479 | A | | 1/1998 | Barnett et al. |
| 5,775,621 | A | | 7/1998 | Sauber |
| 5,967,451 | A | | 10/1999 | Radaios |
| 6,003,667 | A | | 12/1999 | Barnett et al. |
| 6,234,421 | B1 | | 5/2001 | Cox et al. |
| 6,523,777 | B2 | | 2/2003 | Gaudio |
| 7,204,452 | B2 | | 4/2007 | Wilkinson et al. |
| 7,866,594 | B2 | * | 1/2011 | Eggen .................... 242/588.6 |
| 8,136,753 | B2 | * | 3/2012 | Galgano et al. ............ 242/578.2 |
| 8,366,126 | B2 | * | 2/2013 | Galgano et al. ............ 280/47.19 |
| 2003/0080011 | A1 | | 5/2003 | You et al. |
| 2005/0035240 | A1 | | 2/2005 | Weck et al. |
| 2008/0191436 | A1 | * | 8/2008 | Galgano et al. ............ 280/47.11 |
| 2008/0315029 | A1 | * | 12/2008 | Eggen ...................... 242/557 |
| 2010/0084504 | A1 | * | 4/2010 | Eggen .................... 242/598.3 |
| 2011/0048992 | A1 | | 3/2011 | Galgano et al. |
| 2012/0292868 | A1 | * | 11/2012 | Goellner .................... 280/47.19 |
| 2013/0075400 | A1 | * | 3/2013 | Robinson et al. ............ 220/263 |

OTHER PUBLICATIONS

Welcome to Quickspooler.com ((((((How the Quickspooler was invented)))))), downloaded from http://www.quickspooler.com/QS.html on Jul. 14, 2009.

Cable Pull Stands, Cable Caddy, Rope Stand, downloaded from http://cableorganizer.com/cable-pull-stands/ on Jul. 14, 2009.

Hand Caddy, Data Cable Caddy, GL-9520, Greenlee 9520, downloaded from http://cableorganizer.com/greenlee/hand-caddy/ on Jul. 14, 2009.

Cable Reel Rollers, Wire Spool Caddies & Wire Reel Carts, downloaded from http://www.wctproducts.com/cable_reel_menu.htm on Jul. 14, 2009.

Cable Spool Caddy, Wire Spool Caddy & Wire Spool Carts, downloaded from http://www.wctproducts.com/reel_caddy_page.htm on Jul. 14, 2009.

Paige 1 Pac, downloaded from http://www.paigeelectric.com/onepac.html on Jul. 14, 2009.

Belden/8800/Hook-Up Wire Dispenser Rack (Only / Newark.com, downloaded from http://www.newark.com/belden/8800/hook-up-wire-dispenser-rack-only/dp/20M4466 on Jul. 14, 2009.

Jonard/WD-30-Y/Wire Dispenser/Newark.com, downloaded from http://www.newark.com/jonard/wd-30/wire-dispenser/dp10F7539 on Jul. 14, 2009.

Fiber in a Box, AFL Fiber In A Box, Berktek Fiber In A Box, Wholesale Fiber Optic Cable in A . . . , downloaded from http://www.americantechsupply.com/aflfiberinabox.htm on Jul. 14, 2009.

HOTS Jun. 2003, downloaded from http://www.wireville.com/hots/hotsJune03.html on Jul. 14, 2009.

Genesis Cat5 Cable, 1000 Foot Roll in Box—WG-4978210x—SmartHomeUSA.com, downloaded from http://www.smarthomeusa.com/ShopByManufacturer/Genesis/Item/WG-4978210x/ on Jul. 14, 2009.

Fiber Reel-in-Box Cost Savings Analysis, downloaded from http://www.superioressex.com/uploadedFiles/News/Case_Studies/fiber-reel-in%20box.pdf on Jul. 17, 2009.

Carris Reels 10" Caddy, downloaded from http://www.carris.com/products/caddy10.html on Oct. 1, 2009.

Carris Reels Plastic Reels, downloaded from http://www.carris.com/plasticreels.html on Oct. 1, 2009.

Carris Reels Home Page, downloaded from http://www.carris.com/index.html on Oct. 1, 2009.

About TLE Mfg./dba Reels-USA, downloaded from http://reels-usa.com/ on Oct. 1, 2009.

* cited by examiner

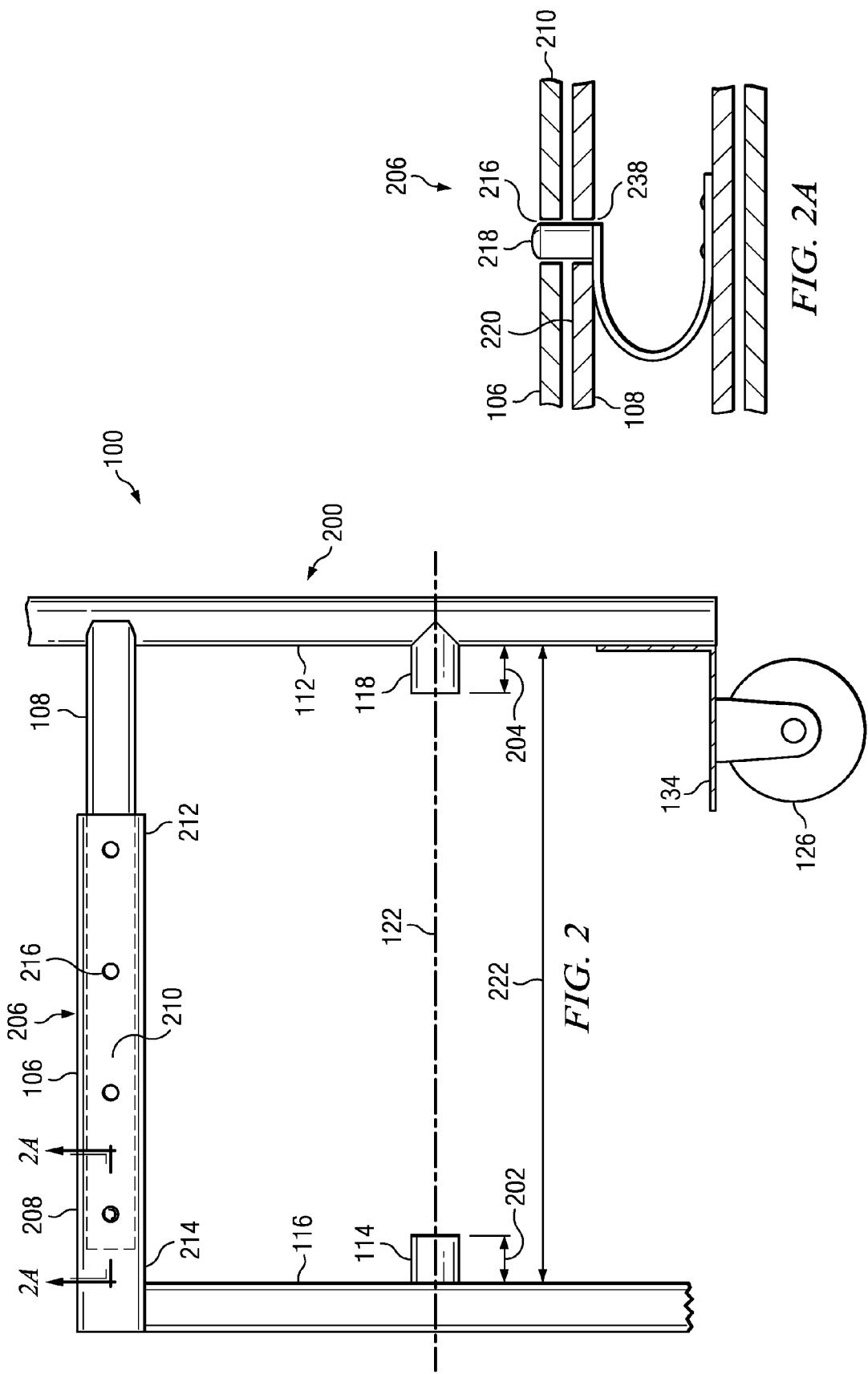

US 8,876,033 B2

TRANSPORTER FOR CONTAINERS OF SPOOLED WIRE OR CABLE

BACKGROUND OF THE INVENTION

Wire and cable for installation in residences and buildings typically comes on cable reels. The types of wire and cable include many different kinds of low-voltage, multiconductor insulated communications cable that are used for setting up Ethernet networks, intercom systems, entertainment systems, and the connection of fire and security sensors and devices. A new building under construction will need many kinds of these cables, and several reels of cable will be used by an installer on-site.

One known technique for distributing cables is to provide one or more coils of cable in a box or carton and to create a hole in a front and/or top panel of the (typically cardboard) carton for pulling out a desired length of cable. This conventional method has the disadvantage that the cable may kink inside of the carton or otherwise resist being pulled out of the carton as it is removed from the carton. As a result, the cable installer or technician can find that he or she is pulling the carton across the floor instead of receiving the necessary length of cable. The assignee of the present invention has developed a reel-containing carton described in U.S. Patent Application Publication No. US 2008/0191436 A1, the specification and drawings of which are specifically incorporated by reference herein, which ameliorates some of these problems.

Cartons or reels of cable are often heavy and awkward to move around the job site, which fatigues the installer and leaves him or her susceptible to work-related injury. Existing wire and cable reel holders represent a first-pass attempt to alleviate this problem, but they usually have large, bulky frames and several rigid cross members and represent a one-size-fits-all approach. They are not designed to accommodate the reels of differing sizes and widths which frequently accompany the various cables that are used a given cable pull. As a result, a need exists for a customizable wire and cable transporter that can accommodate different combinations of reels that have different sizes without the need for moving around a large, bulky rack.

SUMMARY OF THE INVENTION

According to one aspect of the invention, a transporter for manually transporting one or more containers of wire or cable, each container having a carton, has a container support structure, a handle, and one or more stabilization members that are affixed to the container support structure. The support structure includes a first substantially vertical support member with a lower end that is attached to one or more wheels, which are aligned in a direction of travel. A first axial insert extends from the first vertical support member in a first direction on a horizontal axis. A second substantially vertical support member is spaced axially from the first vertical support member and has a second axial insert that is affixed to the second vertical support member on the horizontal axis and extends in a second direction that is opposite the first direction. The second axial insert extends toward the first axial insert.

The transporter has a horizontal support member that is spaced from the horizontal axis and is disposed between and is affixed to the first and second vertical support members. The horizontal support member extends in the first direction and has an overall length that is adjustable. A handle is affixed to the container support structure and one or more stabilization members are affixed to the container support structure and are adapted to abut at least one nonrotational surface of the carton in order to prevent it from rotating about the horizontal axis.

According to another aspect of the invention, a transporter for manually transporting one or more containers of wire or cable, each container having a carton, includes a container support structure, a handle, and one or more stabilization members affixed to the container support structure. The container support structure has a first substantially vertical support member with a lower end that is affixed to one or more wheels that are aligned in a direction of travel. A horizontal support member is disposed between and affixed to the first vertical support member and a second vertical support member that is axially spaced from the first vertical support member. An overall length of the horizontal support member is adjustable.

An axial support member of the transporter may be inserted into a first hole in the first vertical support member and into a second hole in the second vertical support member. When inserted, the axial support member is on a horizontal axis, is spaced from the horizontal support member, and is parallel to the horizontal support member. The handle is affixed to the container support structure and one or more stabilization members are also affixed to the container support structure and are adapted to abut at least one nonrotational surface of the carton or cartons to prevent them from rotating around the horizontal axis.

In another embodiment, a system for manually transporting wire or cable comprises at least one container having a carton and a reel housed in the carton. Each reel is rotatable about a horizontal axis and each carton includes a plurality of panels including a front panel having top, bottom, left and right sides. A top panel extends from the top side of the front panel, a bottom panel extends from the bottom side of the front panel, a left panel extends from the left side of the front panel so as to be orthogonal to the bottom panel, and a right panel extends from the right side of the front panel so as to be parallel and spaced from the left panel. The left panel has a left entry hole and the right panel has a right entry hole. A continuous axial passageway extends through each container and includes the left and right entry holes.

A container support structure of a transporter comprises a first substantially vertical support member with a lower end that is affixed to one or more wheels that are aligned in a direction of travel. A first axial insert is attached to the first vertical support member and extends from the first vertical support member in a first direction that is on a horizontal axis. A second substantially vertical support member is axially spaced from the first vertical support member and has a second axial insert affixed to it on the horizontal axis. The second axial insert extends in a second direction that is opposite the first direction and is toward the first axial insert. When used with a container having a reel of cable, the first and second axial inserts extend through respective entry holes in the carton(s) and, in conjunction with an axial support member (described in more detail below), support one, two, or more containers.

A horizontal support member of the support structure is spaced from the horizontal axis and is disposed between and affixed to the first and second vertical support members. The horizontal support member has an overall length of the horizontal support member is adjustable. A handle is affixed to the container support structure and at least one stabilization member is affixed to the container support structure and is adapted to abut at least one panel of each carton to prevent the cartons from rotating about the horizontal axis. In this way, the stabilization members can contact the one, two, or more containers that are supported by the container support structure and the axial support member.

Alternatively, a system for manually transporting wire or cable includes at least one container having a carton and a reel, a container support structure, a handle affixed to the container support structure, and a stabilization member. Each reel is housed in a carton and is rotatable about a horizontal axis. Each carton has a plurality of panels including a front panel having top, bottom, left and right sides. A top panel extends from the top side of the front panel, a bottom panel extends from the bottom side of the front panel, a left panel extends from the left side of the front panel so as to be orthogonal to the bottom panel, and a right panel extends from the right side of the front panel so as to be parallel and spaced from the left panel. A left entry hole is formed in each left panel, a right entry hole is formed in each right panel, and a continuous axial passageway extends through each left entry hole, reel, and right entry hole.

The container support structure includes a first substantially vertical support member with a lower end that is affixed to one or more wheels that are aligned in a direction of travel. The support structure also has a second substantially vertical support member spaced axially from the first vertical support member. An axial support member is insertable into a first hole in the first vertical support member, through the continuous axial passageway, and into a second hole in the second vertical support member. The inserted axial support member is on a horizontal axis.

A horizontal support member is spaced from and is parallel to the horizontal axis. It is disposed between and affixed to the first and second vertical support members and has an overall length that is adjustable. The one or more stabilization members are preferably affixed to the container support structure and are adapted to abut at least one panel of each carton to prevent them from rotating about the horizontal axis. As above, the stabilization members can contact the one, two, or more containers that are supported by the container support structure and the axial support member.

A method of transporting at least one container, each container having a carton of wire or cable, includes the steps of adjusting a length of an axial support member having a first axial section, a second axial section, and a releasable latch for fixing in place the first axial section relative to the second axial section. Further, the method includes the step of inserting a first end of an axial support member through a continuous axial passageway of the at least one container, which extends through a first entry hole in a first panel of each carton, through a reel housed in each container, and through a second entry hole formed in a second panel of each carton. The second panel is opposite and spaced from the first panel.

The method also includes the steps of inserting the first end of the axial support member into a first axial insert that is attached to a first substantially vertical support member of a container support structure, adjusting the length of the horizontal support member such that a distance between the first and second vertical support members equals a predetermined length, inserting a second end of the axial support member into a second axial insert attached to a second substantially vertical support member of the container support structure, and extending a handle that is affixed to the container support structure. Thus, the axial support member, in conjunction with the carton support structure, can support one, two, or more containers of cable The method can comprise the further steps of rolling the transporter forward, resting a second substantially vertical support member on a support surface, and paying out cable or wire from a slot in a panel of the carton. One or more stabilization members are adapted to abut one or more panels of each carton to prevent it from rotating about a horizontal axis.

Thus, in contrast to the prior art, the claimed transporter has the advantage of being adjustable in size so that it can accommodate one, two, three, or more cartons. Additionally, the transporter acts as a class 2 lever, allowing the user to move heavy reels of wire and cable around the job site with ease. The transporter also keeps the cartons off the ground, which prevents damage to the cartons by moisture or debris. Finally, it also prevents the cartons from rotating as the cable is being pulled, giving each cable or wire pull a constant resistance.

BRIEF DESCRIPTION OF THE DRAWINGS

Further aspects of the invention and their advantages can be discerned in the following detailed description, in which like characters denote like parts and in which:

FIG. 2 is a schematic elevational view showing the container support structure according to an embodiment related to that shown in FIG. 1;

FIG. 2A is a sectional detail taken substantially along line 2A-2A of FIG. 2;

DETAILED DESCRIPTION

Figure 1:
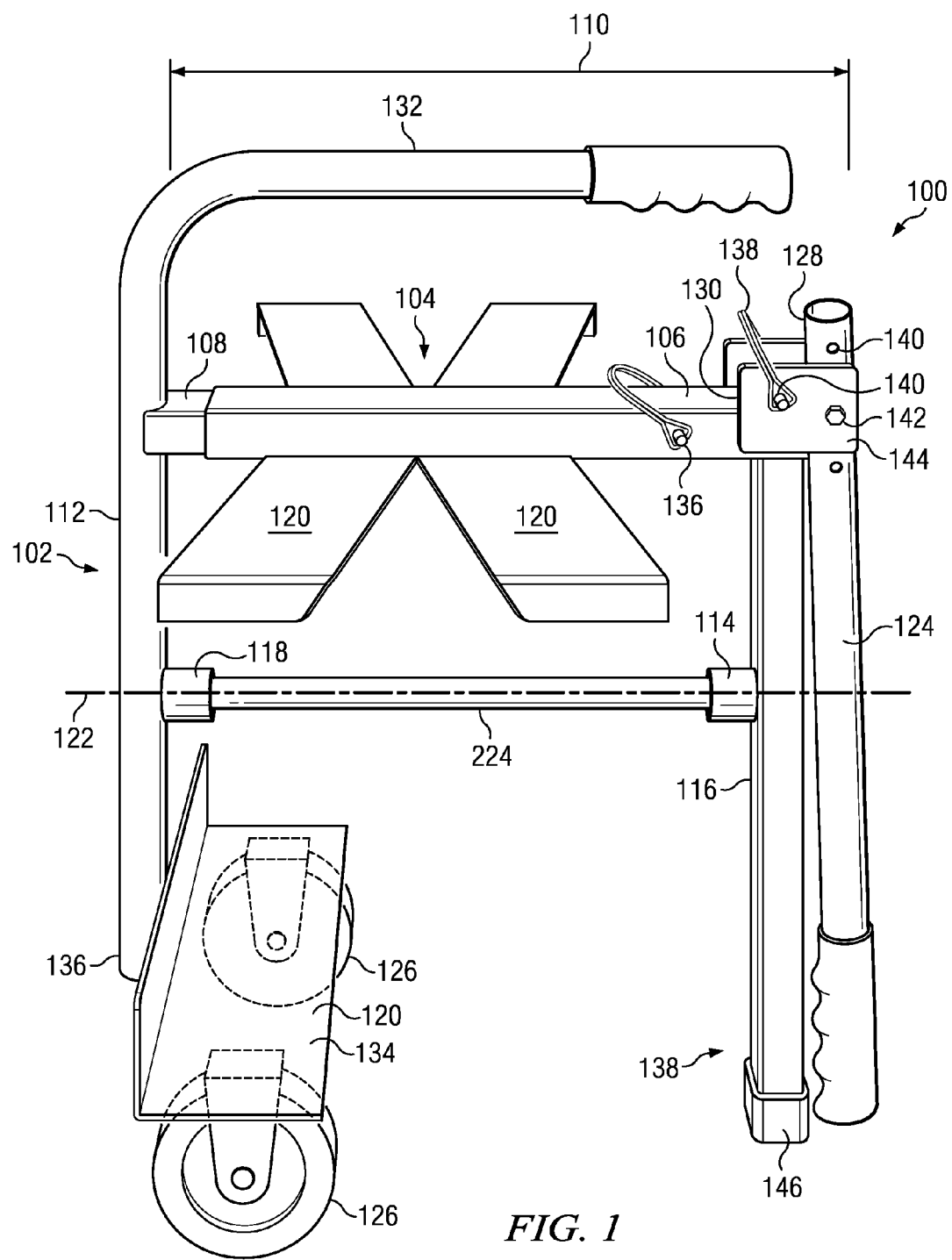
FIG. 1 is an isometric view showing a first embodiment of the invention's apparatus for transporting at least one carton of wire or cable with the handle in the collapsed configuration.

The current invention relates to a transporter, a system, and a method for manually transporting one or more containers of cable or wire. FIGS. 1 and 2 show the transporter, indicated generally at 100, that allows the installer to move the container(s) 301 (see below) of wire or cable. The transporter 100 has a container support structure 102 which includes a first substantially vertical support member 112 with a lower end 136 that is affixed to at least one wheel 126 that is capable of rolling in a direction of travel.

A second substantially vertical support member 116 is axially spaced from the first vertical support member 112 and a horizontal support member 104 is disposed between the first and second vertical support members 112, 116 and is affixed to them. The horizontal support member 104 is parallel to an axis 122 and is preferably spaced to be above the axis 122 but may also be placed to the side of the carton 301 or even under it. An overall length 110 of the horizontal support member 104 is adjustable so that the transporter 102 can accommodate one, two, three, or more containers 301, which further can be of different widths.

A first axial insert 118 (best seen in FIG. 2) is joined as by welding to the first vertical support member 112 so that the insert 118 is on the axis 122. It is also spaced vertically from the horizontal support member 104 by a distance which is somewhat larger than half of the height of the container or containers 301 to be transported. Additionally, it extends from the first vertical support member 112 by a first predetermined distance 204 and projects in a first direction.

Similarly, a second axial insert 114 is affixed to the second vertical support member 116. The second axial insert 114 is also vertically spaced from the horizontal support member 104, is placed on the axis 122, and extends from the second vertical support member 116 by a second predetermined distance 202. The second axial insert 114 extends in a second direction that is opposite the first direction and projects toward the first axial insert 118.

Figure 5:
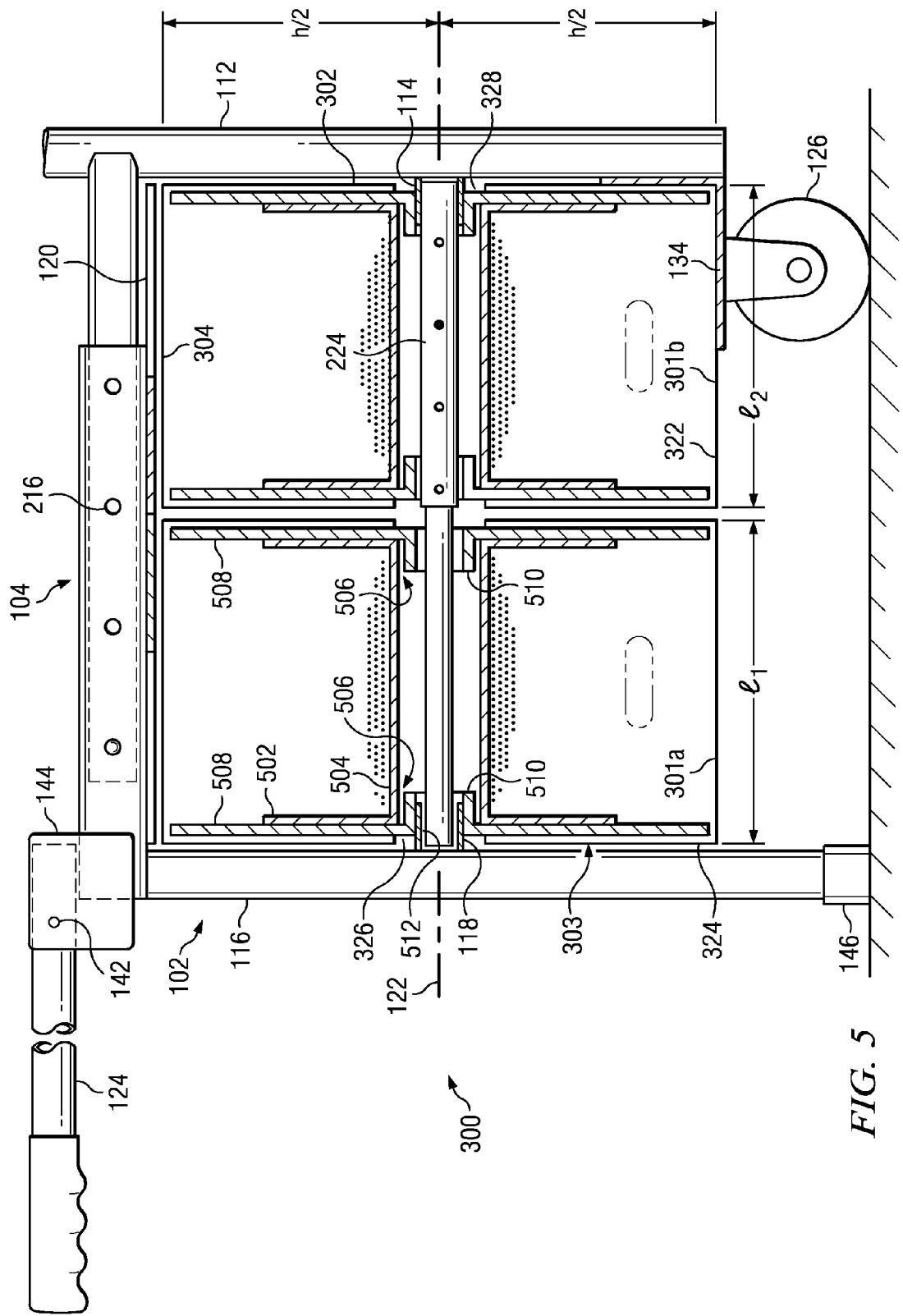
FIG. 5 is a cross sectional view of a system according to the claimed invention showing the transporter and two containers having reels of wire being supported by an adjustable axial support member.

An overall length 110 of the horizontal support member 104 is adjustable. FIGS. 2 and 5 show that the horizontal support member 104 has a first piece 106, which is axially slideable in the first direction relative to a second piece 108. The first and second pieces 106, 108 are affixable to one another at each of a plurality of positions.

The horizontal support member 104 can take a variety of configurations such as two plates bolted to one another, a first tube which is slidably inserted, or telescopes, into a second tube, or even a blade that fits into a corresponding channel. While FIG. 1 shows that the second piece 108 is slidably received into the first piece 108, the opposite configuration can also be used. As such, the claims are not limited to the particular configuration shown in the illustrated embodiments.

FIGS. 2 and 2A show that the transporter 100 also includes a releasable latch 206 for locking the first piece 106 of the horizontal support member 104 with the second piece 108 of the horizontal support member 104. Preferably, the first piece 106 of the horizontal support member 104 comprises a hollow tube 208 with a sidewall 210, a first end 212, a second end 214, and several openings 216 at a plurality of predetermined locations in the sidewall 210.

A detent 218 stands up from an exterior sidewall 220 of the second piece 108 at a predetermined position and acts as a portion of the releasable latch 206. The detent 218 is sized and positioned to fit into one of the openings 216 in the first piece 106 of the horizontal support member 104 when a distance 222 between the first vertical support member 112 and the second vertical support member 116 equals one of a plurality of predetermined lengths. As such, predetermined locations of the openings 216 relate to the predetermined lengths. This allows the transporter to accommodate cartons 301 of different widths.

Figure 3:
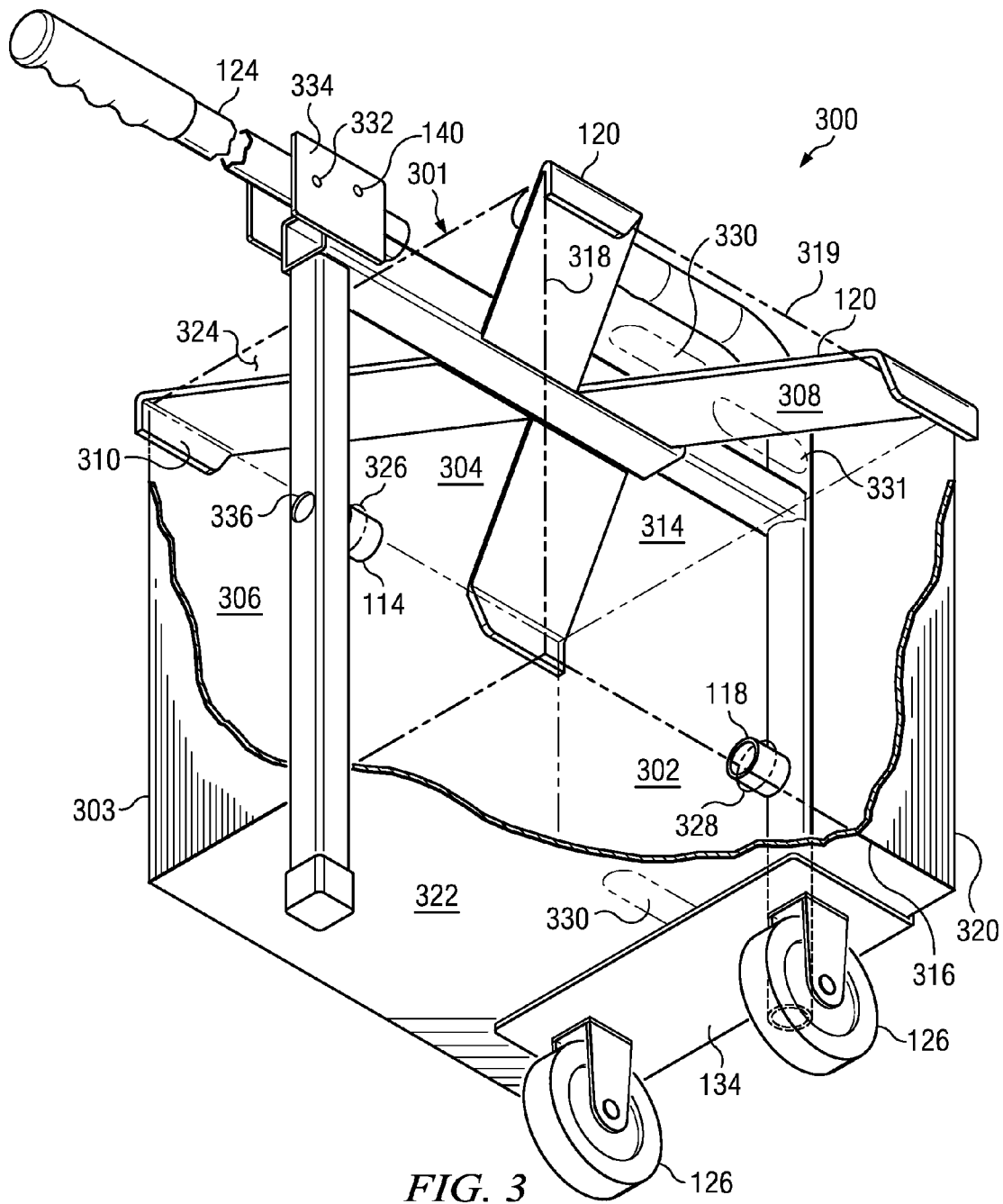
FIG. 3 is an isometric view of the embodiment according to FIG. 1 with a transported carton being shown in dotted line and the handle in the towing configuration.

Referring back to FIG. 1, a handle 124 is affixed to the horizontal support member 104 and one or more wheels 126 is affixed to the container support structure 102, preferably at positions at opposite ends of the carton that is supported on inserts 114, 118 and/or tube 224. Preferably, the handle 124 is convertible between a collapsed configuration as shown in FIG. 1 and a towing configuration as shown in FIG. 3. When the handle 124 is extended to be parallel to the horizontal support member 104, it acts as a rigid extension of the support member 104, making the transporter a class 2 lever that is capable of supporting a portion of the weight of the container 301 and the transporter 100 on the fulcrum created by wheels 126.

When in the collapsed configuration, the handle 124 is not extended and it doesn't act as an extension of the horizontal support member 104. In this event, a foot 146 attached to the bottom 138 of the second substantially vertical support member 116 rests on a support surface such as the ground or a floor. In another embodiment (FIG. 2), foot 146 may be omitted and vertical support member 116 can terminate at a point slightly below insert 114.

The handle 124 may take a variety of configurations, such as a telescoping handle, but the embodiment shown in FIG. 1 is preferred due to its simplicity. A bracket 144 is affixed to the horizontal support member 104 and has an axle 142, typically a pin or bolt, around which the handle 124 rotates. The axle 142 must be sturdy enough to support a substantial amount of the combined weight of the container(s) 301 and the transporter 102 and it must also withstand forces encountered during moving the system 300 around the job site. As such, the axle 142 is preferably made of steel.

In a preferred embodiment, the handle 124 also has a first abutting surface 128 and the horizontal support member 104 has a corresponding second abutting surface 130 that is disposed to abut the first abutting surface 128 when the handle 124 is extended (see FIG. 3). As the handle 124 is rotated or extended into position, the first and second abutting surfaces 128, 130 contact one another and the handle 124 acts as an extension of the horizontal support member 104. The installer can then lock the handle 124 in the extended position by inserting a second pin 138 through holes 140 in the handle 124 and the bracket 144.

In another preferred embodiment, a second handle 132 may be formed as a continuous tube with one of the first and second vertical support members 112, 116.

The system, indicated generally at 300 in FIGS. 3 and 5, comprises at least one container 301 (and commonly at least two of them), each container comprising a carton 303 and a reel 502 (not shown in FIG. 3 for clarity) that is housed in the carton 303 and which is rotatable around the axis 122. As shown in FIG. 3, the carton 303 includes a front panel 314 having top side 319, a bottom side 316, left side 318, and right side 320, a top panel 304 that extends from the top side of the front panel, a bottom panel 322 that extends from the bottom side 316 of the front panel 314, a left panel 324 that extends from the left side 318 of the front panel 314 so as to be orthogonal to the bottom panel 322, a right panel 302 that extends from the right side 320 of the front panel 314 so as to be parallel and spaced from the left panel 324, and a rear panel 306 which is parallel to and spaced from the front panel 314. While the illustrated container 301 is a conventional box built as a right prism on a rectangular base, it may take other shapes.

The carton 303 further comprises a left entry hole 326 in the left panel 324 and a right entry hole 328 in the right panel 302. Thus, when the carton 303 is installed on the transporter 100, the axial inserts 114, 118 are inserted into the entry holes 324, 326 and into holes 506 (see FIG. 5) in either end of the spindle 504 (FIG. 5) such that the axial inserts 114, 118 support the weight of the reel 502.

Figure 2B:
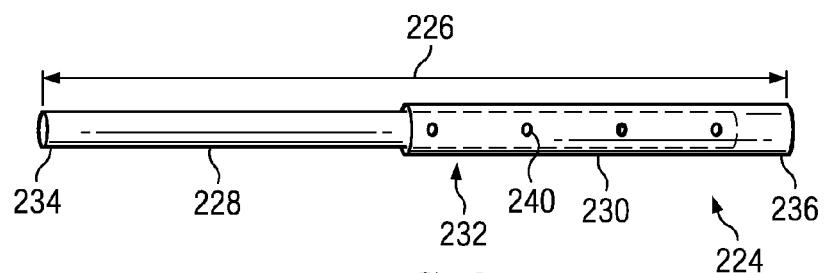
FIG. 2B is a view of an axial support member for use with the embodiment shown in FIGS. 1-2A.

Referring to FIG. 2B, the transporter 100 preferably comprises an axial support member 224 that is insertable through a continuous axial passageway 512 of the one or more containers 301 (support member 224 is shown as having been inserted into the continuous axial passageway 512 in FIG. 5). The axial support member 224 is necessary if the transporter 100 is to be used with two or more containers 301 (as shown in FIG. 5), while the axial inserts 114, 118 may be sufficient to support a single container 301.

The passageway 512 extends through the left entry hole 326, the reel 502, and the right entry hole 328 of each container 301. As such, the axial support member 224 can be inserted through the container 301 and fit into the first and second axial inserts 114, 118. In an alternative embodiment, the axial support member 224 can be inserted directly into respective holes 336 in the first and second vertical support members 112, 116. Therefore, the support member 224 must have a predetermined length 226 that is longer than the width of the container 301 so that its ends 234, 236 may be inserted into the axial inserts 114, 118 and/or the holes 336 in the vertical support members 112, 116.

The axial support member 224 may be a hollow tube or a solid rod and may be slidably received into the first and second axial inserts 114, 118. More preferably, the length 226 of the axial support member 224 is adjustable to a plurality of predetermined lengths. As with the horizontal support member 104, the axial support member 224 preferably telescopes, having a first axial section 228 that slides in relation to a second axial section 230. The support member 224 has a second releasable latch 232 for fixing the first axial support member section 228 relative to the second axial section 230. An arrangement similar to the one above may be used as the latch 232 for the axial support member 224, so that a detent fits into a second plurality of holes 240 that are disposed along a length of the axial support member 224.

Referring back to FIG. 1, the transporter 100 further comprises one or more stabilization members or fins 120 that are affixed to the container support structure 102, preferably at the first piece 106 of the horizontal support member 104. The stabilization members 120 are adapted to abut one or more panels of each carton 301 to prevent the each carton 301 from rotating about the horizontal axis 122. FIG. 3 shows that a single stabilization member 120 can abut one or more panels of the carton.

Preventing rotation of the carton 303 is desirable because it results in a more uniform resistance when pulling the cable. The carton 303 has a tendency to rotate because, as the wire or cable is pulled from the container 301, it travels through a dispensing slot 331 in one of the panels and possibly one or more pass-through openings 330 in the front, top and/or bottom panels 304, 322 (see FIG. 3). As the wire or cable leaves the carton 303, it often impinges on the panel or panels and urges the carton 303 to rotate. Additionally, the friction associated with the rotating reel 502 inside the carton 303 also causes the carton 303 to rotate.

Referring to FIG. 3, the stabilization member 120 generally conforms to at least one nonrotational surface, and preferably two surfaces, such as the top panel 304 and the front panel 314 of the carton 303. More preferably, the stabilization member 120 has a first surface 308 that conforms to the horizontal top surface 304 of the carton 303 and a second surface 310 (labeled on a different stabilization member for clarity) that conforms to a first vertical surface 314 of the carton 301. Most preferably, a stabilization member 120 catches the first and second surfaces 304, 314 of the carton 303 at a corner. As shown in FIG. 5, a single stabilization member 120 may prevent a rotation of more than one carton 303.

The stabilization member or members 120 may be joined as by welding to the first piece 106 and/or the second piece 108 of the horizontal support member 104. A horizontal plate 134 can serve as a stabilization member 120 in addition to or instead of fins 120. The horizontal plate 134 supports at least one carton 303 and is affixed to one of the vertical support members 112, 116. As shown in FIG. 3, the horizontal plate 134 is affixed to a plurality of wheels 126. Members 112, 132, 124, 108, 118, 106, 116, 114, and 224 conveniently can be fabricated of steel tubular shapes. Fins 120 and plate 134 may be fabricated of steel plate.

In an alternative embodiment shown in cross section in FIG. 5, each reel 502 may be supported by caddies 508 within the one or more containers 301. FIG. 5 shows two containers with the continuous axial passageway 512 aligned along the axis 122 and supported by respective pairs of caddies 508. Each caddy 508 has a bushing 510 which is inserted into one of the holes 506 of the spindle 504, providing a smooth surface on which the reel 502 may rotate. When installed onto the transporter 100, the weight of the reel 502 is supported by the bushings 510 of the caddies 508 and thence to the axial inserts 114, 118 which fit inside the bushings 510. When not installed on the transporter 100, the weight of the reel 502 is supported by the caddies 508 and then to the bottom panel 322 of the carton 303. See U.S. Patent Application Publication No. 2010/0006692.

In the system 300, and for each container 301, the axis 122 is disposed at one-half of the height h from the outer surface of the top panel 304 to the outer surface of the lower panel 322. The vertical distance between axis 122 and the lower surface of fin(s) 120 is at least approximately the same as the vertical distance between axis 122 and the upper surface of the lower fin or shelf 134. In this way, when multiple containers 301a,b are transported using transport device 300, all will have reel centers which leave open a continuous axial passageway 512, one of them will fit onto lower shelf 134, and the upper, front, and rear panels 304, 314, 306 of at least two of the containers 301 will be in close contact with two or more fins 120. While the height, h, of the containers 301a, 301b is preferably uniform, the lengths $l_1$, $l_2$ can be different from each other, permitting variation in the size or length of the cable housed in containers 301a,b.

Figure 4:
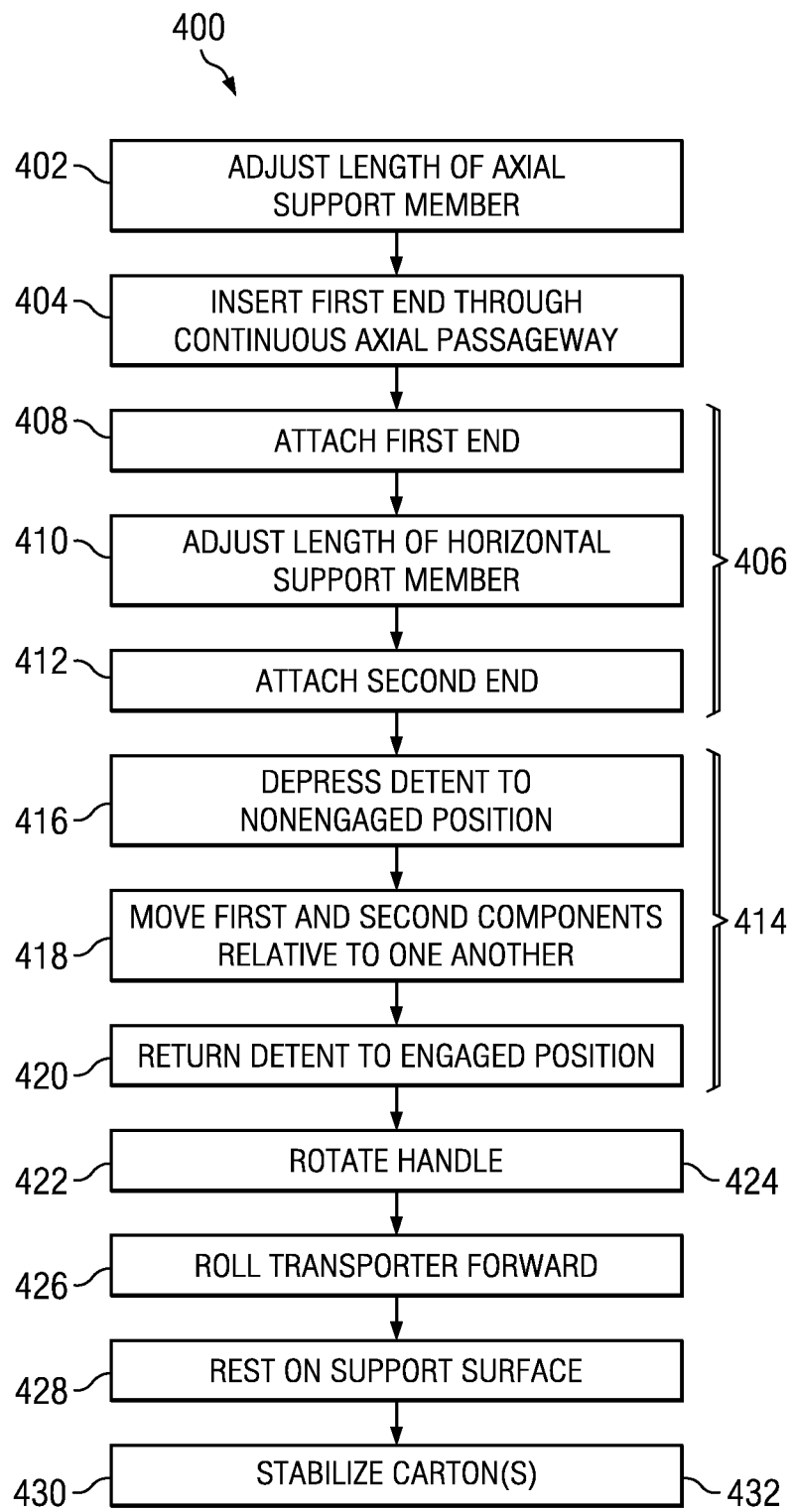
FIG. 4 is a flow diagram showing a method of transporting a carton of material according to the embodiment of FIG. 1.

A method, indicated generally at (400) in FIG. 4, of transporting at least one container 301 having a carton 303 of wire or cable comprises the step of adjusting (402) the length 226 of the axial support member 224 with a releasable latch 232 that affixes the first axial section 228 and the second axial section 230. The first end 234 of the axial support member 224 is inserted (404) through the continuous axial passageway 512 all of the container(s) 301 and the container(s) 301 are affixed (406) to the transporter 100 by attaching (408) the first end 234 to the first substantially vertical support member 112, adjusting (410) the overall length 110 of the horizontal support member 104 such that a distance 222 between the first and second substantially vertical support members 112, 116 equals a predetermined length selected to be slightly longer than an axial length of the carton or cartons 303 to be transported. The installer also attaches (412) the second end 236 of the axial support member 224 to the second substantially vertical support member 116.

The user affixes (414) the first and second pieces 106, 108 to one another by depressing (416) the detent 218 to a non-engaged position, moving (418) the first and second pieces 106, 108 relative to one another, and returning (420) the detent 218 to an engaged position in which the detent 218 fits inside one of a plurality of holes 216 which are set at a plurality of predetermined positions. Thus, the predetermined location of the detent 218 relates to predetermined length 222 between the first substantially vertical support member 112 and the second substantially vertical support member 116.

The step of extending (422) the handle 124 preferably comprises the substep of rotating (424) the handle 124 about an axle 142 or pivot point that is affixed to the container support structure 102 such that a first abutting surface 128 of the handle 124 abuts the second abutting surface 130.

The installer then rolls (426) the system 300 to the desired location, rests (428) the foot 146 attached to the bottom 138 of the second substantially vertical support member 116 on the supporting surface. The installer then dispenses (430) the wire or cable by pulling the cable out of a slot 331 in a panel of the carton(s) 303. During this step, one or more stabilization members 120 stabilize (432) the carton(s) 303.

In summary, the different embodiments of the invention show that it may be used in a wide variety of applications and will increase the portability of any one, two, or more reel-containing containers having axial entry holes. Also, the different embodiments of the invention will save significant amounts of time at worksites, thereby reducing costs, and improve handling of these cumbersome objects, thereby increasing worker safety.

While illustrated embodiments of the present invention have been described and illustrated in the appended drawings, the present invention is not limited thereto but only by the scope and spirit of the appended claims.

We claim:

1. A transporter for manually transporting at least one container, each container including a carton of wire or cable, the transporter comprising:
   a container support structure comprising:
   a first substantially vertical support member having a lower end affixed to at least one wheel aligned in a direction of travel;
   a first axial insert attached to the first vertical support member and extending from the first vertical support member in a first direction on a horizontal axis;
   a second substantially vertical support member axially spaced from the first vertical support member;
   a second axial insert affixed to the second vertical support member on the horizontal axis and extending in a second direction opposite the first direction toward the first axial insert;
   a horizontal support member spaced from the horizontal axis, disposed between and affixed to the first vertical support member and the second vertical support member, an overall length of the horizontal support member being adjustable;
   a handle affixed to the container support structure; and
   at least one stabilization member affixed to the container support structure and adapted to abut at least one non-rotational surface of the at least one carton to prevent the at least one carton from rotating about the horizontal axis,
   the handle being convertible between a towing configuration in which the handle is extended to be parallel to and acts as a rigid extension of the horizontal support member, and a collapsed configuration in which the handle is not extended and does not act as an extension of the horizontal support member.

2. The transporter of claim 1, further comprising a bracket affixed to the horizontal support member, an axle passing through the bracket which acts as a pivot around which the handle rotates such that a first abutting surface of the handle abuts a second abutting surface of the horizontal support member when the handle is in the towing configuration.

3. A transporter for manually transporting at least one container, each container including a carton of wire or cable, the transporter comprising:
   a container support structure comprising:
   a first substantially vertical support member having a lower end affixed to at least one wheel aligned in a direction of travel;
   a first axial insert attached to the first vertical support member and extending from the first vertical support member in a first direction on a horizontal axis;
   a second substantially vertical support member axially spaced from the first vertical support member;
   a second axial insert affixed to the second vertical support member on the horizontal axis and extending in a second direction opposite the first direction toward the first axial insert;
   a horizontal support member spaced from the horizontal axis, disposed between and affixed to the first vertical support member and the second vertical support member, an overall length of the horizontal support member being adjustable;
   a handle affixed to the container support structure; and
   at least one stabilization member affixed to the container support structure and adapted to abut at least one non-rotational surface of the at least one carton to prevent the at least one carton from rotating about the horizontal axis, the horizontal support member having a first piece that is slideable in an axial direction relative to a second piece and is affixable to the second piece at each of a plurality of positions.

4. The transporter of claim 3, further comprising a releasable latch for fixing in place the first piece of the horizontal support member relative to the second piece of the horizontal support member.

5. The transporter of claim 4, wherein the second piece telescopes inside the first piece.

6. The transporter of claim 5, wherein the first piece further comprises a hollow tube having a sidewall with a plurality of openings at a plurality of predetermined locations and the releasable latch comprises a detent upstanding from an exterior sidewall of the second piece of the horizontal support member at a predetermined position; and
   wherein the detent is sized and positioned to fit into one of the first plurality of openings when a distance between the first vertical support member and the second vertical support member equals one of a plurality of predetermined lengths, such that the predetermined locations of the openings relate to the predetermined lengths.

7. The transporter of claim 3, further comprising an axial support member extending from the first axial insert to the second axial insert.

8. A transporter for manually transporting at least one container, each container including a carton of wire or cable, the transporter comprising:
   a container support structure comprising:
   a first substantially vertical support member having a lower end affixed to at least one wheel aligned in a direction of travel;
   a first axial insert attached to the first vertical support member and extending from the first vertical support member in a first direction on a horizontal axis;
   a second substantially vertical support member axially spaced from the first vertical support member;
   a second axial insert affixed to the second vertical support member on the horizontal axis and extending in a second direction opposite the first direction toward the first axial insert;
   a horizontal support member spaced from the horizontal axis, disposed between and affixed to the first vertical support member and the second vertical support member, an overall length of the horizontal support member being adjustable;
   a handle affixed to the container support structure; and
   at least one stabilization member affixed to the container support structure and adapted to abut at least one non-rotational surface of the at least one carton to prevent the at least one carton from rotating about the horizontal axis, the stabilization member conforming to at least two nonrotational surfaces of the container.

9. The transporter of claim 8, wherein the at least one stabilization member comprises a horizontal plate for supporting a container, the horizontal plate being affixed to the first vertical support member and the at least one wheel.

10. The transporter of claim 8, wherein the stabilization member is affixed to the horizontal support member.

11. The transporter of claim 8, wherein the stabilization member has a first surface conforming to a horizontal top surface of the container, a second surface conforming to a first vertical surface of the container, and a third surface conforming to a second vertical surface of the container spaced from the first vertical surface of the container.

12. A transporter for manually transporting a container including at least a first carton of wire or cable, comprising:
   a container support structure comprising:
      a first substantially vertical support member having a lower end affixed to at least one wheel aligned in a direction of travel;
      a second substantially vertical support member axially spaced from the first vertical support member;
      a horizontal support member disposed between and affixed to the first vertical support member and the second vertical support member, an overall length of the horizontal support member being adjustable;
      an axial support member insertable into a first hole in the first vertical support member and into a second hole in the second vertical support member, the inserted axial support member being on a horizontal axis, spaced from the-horizontal support member, and parallel to the-horizontal support member;
   a handle affixed to the container support structure; and
   at least one stabilization member affixed to the container support structure and adapted to abut at least one non-rotational surface of the carton to prevent the carton from rotating around the horizontal axis.

13. The transporter of claim 12, the axial support member further comprising a second plurality of holes disposed along a length of the support member.

14. A system for manually transporting wire or cable, comprising:
   at least a first container, each container comprising a carton and a reel housed in the carton and rotatable about a horizontal axis, the carton including
      a plurality of panels including a front panel having top, bottom, left and right sides, a top panel extending from the top side of the front panel, a bottom panel extending from the bottom side of the front panel, a left panel extending from the left side of the front panel so as to be orthogonal to the bottom panel, and a right panel extending from the right side of the front panel so as to be parallel and spaced from the left panel;
      a left entry hole formed in the left panel;
      a right entry hole formed in the right panel;
   a continuous axial passageway through each container, the continuous axial passageway including the left and right entry holes;
   a container support structure comprising:
      a first substantially vertical support member having a lower end affixed to at least one wheel aligned in a direction of travel;
      a first axial insert for insertion through an entry hole, the first axial insert attached to the first vertical support member and extending from the first vertical support member in a first direction on a horizontal axis;
      a second substantially vertical support member;
      a second axial insert for insertion through another entry hole, the second axial insert attached to the second vertical support member on the horizontal axis and extending in a second direction opposite the first direction and toward the first axial insert;
      a horizontal support member spaced from the horizontal axis, disposed between and affixed to the first vertical support member and the second vertical support member, an overall length of the horizontal support member being adjustable;
   a handle affixed to the container support structure; and
   at least one stabilization member affixed to the container support structure and adapted to abut at least one panel of the carton to prevent the carton from rotating about the horizontal axis.

15. The system of claim 14, the horizontal support member having a first piece that is slideable in the first direction relative to a second piece and is affixable to the second piece at a plurality of positions.

16. The system of claim 15, further comprising a releasable latch for fixing in place the first piece of the horizontal support member relative to the second piece of the horizontal support member.

17. The system of claim 16, wherein the second piece telescopes inside the first piece.

18. The system of claim 17, wherein the first piece further comprises a hollow tube having a sidewall with a plurality of openings at a plurality of predetermined locations and the releasable latch comprising a detent upstanding from an exterior sidewall of the second piece of the horizontal support member at a predetermined position; and
   wherein the detent is sized and positioned to fit into one of the first plurality of openings when a distance between the first vertical support member and the second vertical support member equals one of a plurality of predetermined lengths, such that the predetermined locations of the openings relate to the predetermined lengths.

19. The system of claim 14, further comprising an axial support member for attachment to the first axial insert and the second axial insert and insertion through the continuous axial passageway of each container.

20. The system of claim 19, further comprising a second container, the entry holes of the first and second containers disposed on the axis such that the axial support member is insertable through the continuous axial passageways of the first and second containers.

21. The system of claim 14, wherein the stabilization member has a first surface conforming to a horizontal first surface of the carton, a second surface conforming to a first vertical surface of the carton, and a third surface conforming to a second vertical surface of the carton spaced from the first vertical surface of the carton.

22. The system of claim 14, further comprising a pass-through opening in at least one of the front, top, and bottom panels for removal of wire or cable from the carton.

23. The system of claim 14, wherein the handle is convertible between a towing configuration in which the handle is extended and the handle acts as a lever to support a portion of the weight of the container, and a collapsed configuration in which the handle is not extended and does not act as a lever to support a portion of the weight of the container.

24. The system of claim 23, the handle further comprising a bracket affixed to the horizontal support member, the bracket having an axle passing through the bracket which acts as a pivot around which the handle rotates such that a first abutting surface of the handle abuts a second abutting surface of the horizontal support member when the handle is in the towing configuration.

25. A system for manually transporting wire or cable, comprising:

at least a first container, each container comprising a carton and a reel housed in the carton and rotatable about a horizontal axis, each carton including
    a plurality of panels including a front panel having top, bottom, left and right sides, a top panel extending from the top side of the front panel, a bottom panel extending from the bottom side of the front panel, a left panel extending from the left side of the front panel so as to be orthogonal to the bottom panel, and a right panel extending from the right side of the front panel so as to be parallel and spaced from the left panel;
    a left entry hole formed in the left panel;
    a right entry hole formed in the right panel;
a continuous axial passageway through the left entry hole, the reel, and the right entry hole;
a container support structure including
    a first substantially vertical support member having a lower end affixed to at least one wheel aligned in a direction of travel;
    a second substantially vertical support member axially spaced from the first vertical support member;
    an axial support member insertable through the continuous axial passageway, into a first hole in the first vertical support member, and into a second hole in the second vertical support member, the inserted axial support member being on a horizontal axis;
    a horizontal support member spaced from and parallel to the horizontal axis, disposed between and affixed to the first vertical support member and the second vertical support member, an overall length of the horizontal support member being adjustable;
    a handle affixed to the container support structure; and
    at least one stabilization member affixed to the container support structure and adapted to abut at least one panel of the carton to prevent the carton from rotating about the horizontal axis.

26. The system of claim 25, wherein a length of the axial support member is adjustable.

27. The system of claim 26, the axial support member further comprising a first axial section, a second axial section, and a second releasable latch for fixing in place the first axial support member section relative to the second axial section.

28. The system of claim 25, further comprising a second container, the entry holes of the first and second containers disposed on the axis such that the axial support member is insertable through the continuous axial passageways of the first and second containers.

29. A method of transporting at least one container, each container having a carton of wire or cable comprising the steps of:
    adjusting a length of an axial support member having a first axial section, a second axial section, and a releasable latch for fixing in place the first axial support member section relative to the second axial section;
    inserting a first end of the axial support member through a continuous axial passageway of the at least one container, the continuous axial passageway extending through a first entry hole in a first panel of each carton, through a reel housed in each container, and through a second entry hole formed in a second panel of each carton, the second panel being opposite and spaced from the first panel;
    inserting the first end of the axial support member into a first axial insert attached to a first substantially vertical support member of a container support structure;
    adjusting an overall length of a horizontal support member disposed between and affixed to the first and second substantially vertical support members such that a distance between the first substantially vertical support member and the second substantially vertical support member equals a predetermined length;
    inserting a second end of the axial support member into a second axial insert attached to a second substantially vertical support member of the container support structure; and
    extending a handle affixed to the container support structure.

30. The method of claim 29, wherein the step of extending the handle comprises the substep of rotating the handle about a pivot affixed to the container support structure such that a first abutting surface of the handle abuts a second abutting surface of the container support structure such that the extended handle acts as an extension of the container support structure.

31. The method of claim 29, further including the step of affixing a first piece of the horizontal support member to a second piece of the horizontal support member at one of a plurality of predetermined positions with a second releasable latch.

32. The method of claim 31, said step of affixing the first piece to the second piece comprising the substeps of
    depressing a detent of the releasable latch to a nonengaged position, the detent upstanding from an exterior sidewall of the second piece of the horizontal support member; and
    moving the second piece of the horizontal support member relative to the first piece of the horizontal support member to a predetermined location;
    while the second piece is at the predetermined location, returning the detent to an engaged position such that the detent fits into one of a plurality of openings in a sidewall of the first piece, such that predetermined location relates to the predetermined length and the detent prevents movement of the first piece relative to the second piece.

33. The method of claim 29, further comprising the step of dispensing the wire or cable through a slot in a third panel of the carton.

34. The method of claim 33, wherein the step of dispensing further comprises the substep of stabilizing the carton with a stabilization member adapted to abut at least one nonrotational surface of the carton.

35. A method of transporting at least a first container, each container including a carton of wire or cable, the method comprising the steps of:
    affixing the first container to a transporter including
        a first substantially vertical support member having a lower end affixed to at least one wheel;
        a second substantially vertical support member;
        a horizontal support member disposed between and affixed to the first vertical support member and the second vertical support member, an overall length of the horizontal support member being adjustable;
        a handle;
        at least one stabilization member adapted to abut at least one panel of the carton to prevent the carton from rotating about a horizontal axis; and
    transporting the at least first container by extending the handle and rolling the transporter forward;
    resting the second substantially vertical support member on a support surface; and
    dispensing cable or wire from a slot in a panel of the carton.

36. The method of claim 35, further comprising the step of adjusting the overall length of the horizontal support member such that a distance between the first and second substantially vertical support members equals a predetermined length.

37. The method of claim 35, wherein the step of affixing includes the substeps of
- inserting a first end of an axial support member through a continuous axial passageway of the first container, the continuous axial passageway extending from the first entry hole to a second entry hole formed in a second panel of the carton, the second panel being opposite the first panel;
- affixing the first end of the axial support member to the first substantially vertical support member; and
- affixing a second end of the axial support member to the second substantially vertical support member.

38. The method of claim 37, further comprising the step of adjusting a length of the axial support member having a first axial section, a second axial section, and a second releasable latch for fixing in place the first axial support member section relative to the second axial section.

39. The method of claim 37, further comprising the step of inserting the first end of the axial support member through a continuous axial passageway of a second container.

40. The method of claim 39, further comprising the step of inserting the first end of the axial support member through a continuous axial passageway of a third container.

\* \* \* \* \*